(12) United States Patent
Kamin et al.

(10) Patent No.: US 9,529,953 B2
(45) Date of Patent: Dec. 27, 2016

(54) SUBTHRESHOLD STANDARD CELL LIBRARY

(71) Applicants: Nackieb M. Kamin, Kapolei, HI (US);
Gregory Lum, Honolulu, HI (US);
Henry Au, Honolulu, HI (US)

(72) Inventors: Nackieb M. Kamin, Kapolei, HI (US);
Gregory Lum, Honolulu, HI (US);
Henry Au, Honolulu, HI (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/049,762

(22) Filed: Feb. 22, 2016

(65) Prior Publication Data
US 2016/0203243 A1 Jul. 14, 2016

Related U.S. Application Data

(63) Continuation-in-part of application No. 13/564,902, filed on Aug. 2, 2012.

(51) Int. Cl.
*G06F 17/50* (2006.01)

(52) U.S. Cl.
CPC ........... *G06F 17/505* (2013.01); *G06F 17/504* (2013.01); *G06F 17/5031* (2013.01); *G06F 17/5068* (2013.01); *G06F 17/5081* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 5,266,848 A | * | 11/1993 | Nakagome | ....... H03K 3/356017 326/62 |
| 5,763,907 A | * | 6/1998 | Dallavalle | ........... H01L 27/0207 257/202 |
| 6,634,015 B2 | * | 10/2003 | Lee | ....................... G06F 17/505 438/14 |

(Continued)

OTHER PUBLICATIONS

T. Gemmeke et al., "Variability Aware Cell Library Optimzation for Reliable Sub-Threshold operation," 2012 IEEE, pp. 58-61.*

(Continued)

*Primary Examiner* — Leigh Garbowski
(74) *Attorney, Agent, or Firm* — SSC Pacific Patent Office; Arthur K. Samora; Kyle Eppele (57) ABSTRACT

A subthreshold standard cell library addresses the energy efficiency of electronic systems, thereby significantly reducing power consumption. Recent energy performance requirements are causing the next-generation system manufacturers to explore approaches to lower power consumption. Subthreshold operation has been examined and implemented in designing ultra-low power standard cell designs that operate beyond the normal modes of operation, with the potential for large energy savings. Operation of CMOS (Complementary Metal Oxide Semiconductor) transistors in the subthreshold regime, where the supply voltage used in operation is orders of magnitude below the normal operating voltage of typical transistors, has proven to be very beneficial for energy constrained systems as it enables minimum energy consumption in Application Specific Integrated Circuits (ASICs).

4 Claims, 5 Drawing Sheets

(56) References Cited

U.S. PATENT DOCUMENTS

| | | | | |
|---|---|---|---|---|
| 6,668,358 | B2* | 12/2003 | Friend | G06F 17/505 716/103 |
| 7,010,475 | B2* | 3/2006 | Ehrler | G06F 17/5022 702/34 |
| 7,051,306 | B2* | 5/2006 | Hoberman | G06F 1/3203 716/127 |
| 7,185,294 | B2 | 2/2007 | Zhang | |
| 7,256,608 | B2* | 8/2007 | Ranganathan | H03K 19/00361 326/112 |
| 7,441,211 | B1* | 10/2008 | Gupta | G06F 17/5063 716/113 |
| 7,653,885 | B2* | 1/2010 | Nandy | G06F 17/5045 703/13 |
| 8,219,950 | B2* | 7/2012 | Pelloie | H01L 27/0207 716/110 |
| 8,390,331 | B2* | 3/2013 | Veendrick | H01L 27/0207 257/E21.602 |
| 8,527,933 | B2 | 9/2013 | Sharma | |
| 8,589,853 | B2* | 11/2013 | Mbouombouo | G06F 17/505 716/132 |
| 8,713,511 | B1* | 4/2014 | Clark | G06F 17/5045 716/134 |
| 2010/0242010 | A1* | 9/2010 | Pelloie | H01L 27/0207 716/100 |
| 2013/0107651 | A1* | 5/2013 | Singh | G11C 11/412 365/207 |

OTHER PUBLICATIONS

B. Liu et al., "Library tuning for Subthreshold Operation," 2012 IEEE Subthreshold Microelectronics Conference (SubVT), pp. 1-3.*

J. Zhou et al., "A 40 nm Dual-Width Standard Cell Library for Near/Sub-Threshold Operation," IEEE Trans. on Circuits and Systems-I: Regular Papers, vol. 59, No. 11, Nov. 2012, pp. 2569-2577.*

Amarchinta, S. et al, "Robust and High Performance Subthreshold Standard Cell Design"; Circuits and Systems, 2009. MWSCAS '09. 52nd IEEE International Midwest Symposium; Aug. 2-5, 2009; pp. 1183-1186.

Keane, J. et al; Subthreshold Logical Effort: A Systematic Framework for Optimal Subthreshold Device Sizing; Proceeding of the 43rd annual Design Automation Conference, New York, NY; (2006); pp. 425-428.

Kanitkar, Hrishikesh, Subthreshold Circuits: Design, Implementation and Application; M.S.E.E. Thesis, Rochester Institute of Technology, Feb. 2009.

Liu, Bo et al., Standard Cell Sizing for Subthreshold Operation; Design Automation Conference (DAC), 2012 49th ACM/EDAC/IEEE, San Francisco, CA, ISBN 978-1-4503-1199-1, pp. 962,967.

Djigbenou, Jeannette Donan et al., Development of TSMC 0.25uM Standard Cell Library, 2007 IEEE SoutheasCon Proceedings, pp. 566-568.

Djigbenou, Jeannette Donan et al., Development and Distribution of TSMC 0.25 uM Standard CMOS Library Cells, 2007 IEEE International Conference on Microelectronic Systems Education (MSE '07).

Jambek, Asral bin Bahari et al., Standard Cell Library Development, The Eleventh International Conference on Microelectronics, 1999 (ICM '99), pp. 161-163.

Calhoun, Benton H., Modeling and Sizing for Minimum Energy Operation in Subthreshold Circuits, IEEE Journal of Solid-State Circuits, vol. 40, No. 9, Sep. 2005, pp. 1778-1786.

Zhou, Jun et al., A 40 nm Inverse-Narrow-Width-Effect-Aware Sub-Threshold Standard Cell Library, Design Automation Conference (DAC), 2011 48th ACM/EDAC/IEEE, ISBN 978-1-4503-0636-2, pp. 441-446.

Beikahmadi, Mohammad, Developing a Standard Cell Library for Subthreshold Source-Coupled Logic, Master's Thesis, Swiss Federal Institute of Technology, Lausanne, Jan. 2009.

"Market Analysis", obtained from http://www.tsmc.com/download/ir/annualReports/1997/business3.html, downloaded, Dec. 17, 2015.

* cited by examiner

SUBTHRESHOLD STANDARD CELL LIBRARY

This application is a continuation-in-part of U.S. patent application Ser. No. 13/564,902, filed Aug. 2, 2012 by Nackieb M. Kamin et al., for an invention entitled "A Subthreshold Standard Cell Logic Library". The '902 application is assigned to the same assignee as the present invention, and the contents on the '902 application are hereby incorporated by reference.

FEDERALLY-SPONSORED RESEARCH AND DEVELOPMENT

The present invention (Navy Case NC 103970) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND OF THE INVENTION

This invention addresses the energy efficiency of electronic systems, thereby significantly reducing power consumption. This invention addresses in particular application specific integrated circuits (ASICs) or System-on-Chips (SoCs).

Previous methods of increasing battery life for an ASIC device meant increasing the capacity of the battery. This can be done by either improving the battery technology or increasing the size of the battery. However, in some instances, lower power consumption (extended battery life) may be a viable tradeoff for operational speed of the ASIC, especially if by operating the ASIC device in the subthreshold region of operation, the power reduction can be orders of magnitude less. This negates the need for larger, heavier and more costly batteries.

SUMMARY OF THE INVENTION

In one embodiment, the standard cell logic library can include a plurality of logic gate components for synthesizing application specific integrated circuits (ASICs), with each logic gate having an nMOS/pMOS width ratio that is chosen according to the logic function for the gate for operation in the subthreshold voltage region; an operating $V_{dd}$ component including positive supply voltages for the respective integrated circuits; a synthesis library component including timing, temperature and physical characteristics of the respective integrated circuits; and a physical library component including symbol, schematic and mask layouts for the respective circuits.

BRIEF DESCRIPTION OF THE DRAWINGS

The invention will be more fully described in connection with the annexed drawings, where like referenced characters designate like components, in which:

FIG. 5 is a diagram of the schematic symbols for the standard cells for the library of FIG. 2; and, FIG. 6 is a graph of operating frequency versus for voltage in mV for a 4 bit counter test vehicle, which illustrates test results that demonstrate an improvement in operating frequency that can be realized from the library of FIG. 2.

DETAILED DESCRIPTION OF THE EMBODIMENTS

Figure 1:
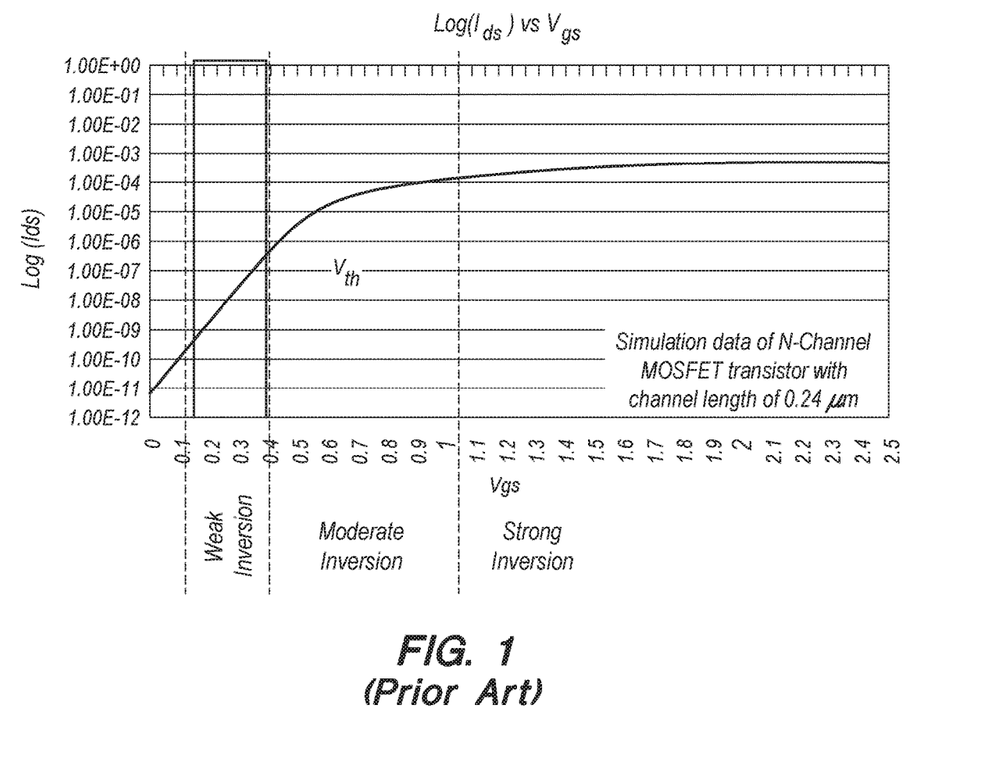
FIG. 1 is a graph of logarithmic value of drain current versus gate voltage, which illustrates general current-voltage characteristics of an N-type Metal Oxide Semiconductor Field Effect Transistor (MOSFET) device.

In brief overview and referring initially to FIG. 1, a graph of logarithmic drain current versus voltage is shown, to illustrate general current-voltage characteristics for an n-type Metal Oxide Semiconductor Field Effect Transistor (MOSFET). The parameters in FIG. 1 are Log ($I_{ds}$) vs. $V_{gs}$. As shown in FIG. 1, and known in the prior art, MOSFET's can have weak inversion, also known as subthreshold region, moderate inversion and strong inversion regions of operation.

Typically, the strong inversion region is the design space for Application Specific Integrated Circuits (ASICs). One purpose of this invention can be to provide a subthreshold standard cell logic library for designing application specific integrated circuits for sensor systems. In particular, an ultra-low power Complementary Metal Oxide Semiconductor (CMOS) standard cell library of logic devices is provided for operating in the subthreshold region for synthesizing ASICs.

From operation in the subthreshold regions, the advantages and novel aspects of this invention over the current methods can include reduction in power consumption (orders of magnitude), reduced heat generation, increased circuit longevity and smaller required power supply. With reduced heat generation, there can also be less required cooling for the ASIC. Normally at the transistor level they are operated in the strong inversion region as their region of operation. The difference in this invention is that the devices described in the standard cell library operate in the subthreshold region which is within the weak inversion region.

This invention addresses the energy efficiency of electronic systems, thereby significantly reducing power consumption. Recent energy performance requirements are causing the next-generation system manufacturers to explore approaches to lower power consumption. Subthreshold operation has been examined and implemented in designing ultra-low power standard cell designs that operate beyond the normal modes of operation, with the potential for large energy savings.

Operation of CMOS transistors in the subthreshold regime, where the supply voltage used in operation is orders of magnitude below the normal operating voltage of typical transistors, has proven to be very beneficial for energy constrained systems as it enables minimum energy consumption in ASICs.

Each standard cell can consist of a combination of MOSFETs. In MOSFETs a voltage on the oxide-insulated gate electrode can induce a conducting channel between the two other contacts called source and drain and an inversion layer forms at the interface between the oxide and the body of the transistor. As stated above, MOSFETs typically operate in three regions of operation—strong, moderate, and weak inversion (or subthreshold). Most advanced devices typically operate in strong or moderate inversion region; therefore, many foundries only develop logic standard cells for ASIC/System-on-Chip (SoC) designs for the strong and moderate region of operation.

A subthreshold standard cell library can be provided for replacing ASICs and System-on-Chips (SoCs) with ASICs and SoC that are built with transistors that uses a fraction of the same amount of power. The subthreshold ASIC is able to have the substantially the same functionality as the original, but with improvements that follow from a decrease in power consumption.

As described above, previous methods of increasing battery life meant increasing the capacity of the battery. This is done by either improving the battery technology or increasing the size of the battery. However, by operating the ASIC device in the subthreshold region of operation the power reduction can be orders of magnitude less. This can negate the need for a larger, heavier and more costly battery.

This invention can consist of a library of standard logic gates (transistors), which can operate in the subthreshold region of operation. By operating in this ultra-low power region, the transistors can use a fraction of the power they normally would.

Currently, Application Specific Integrated Circuits (ASICs) can consist of upwards of millions of transistors. By reducing the power for each of the transistors the total circuit would consume orders of magnitude less power. The power is reduced by the smaller applied electric field applied to the transistors. This generic 0.25 µm technology subthreshold standard cell library for SoC solutions can include the logic gates, operating $V_{dd}$ (positive supply voltage), synthesis library, and a physical library, as described more fully below.

Figure 2:
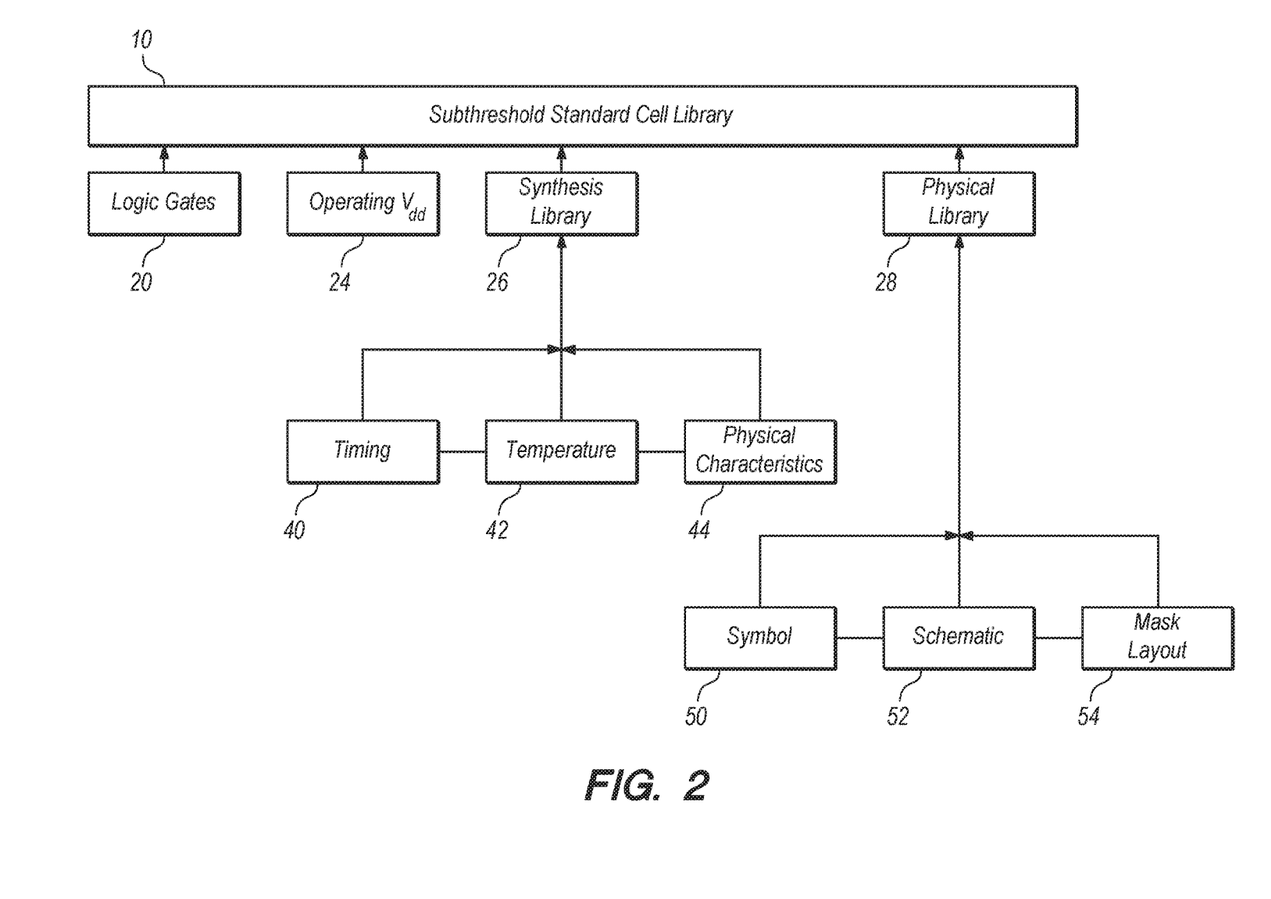
FIG. 2 shows a block diagram of a subthreshold standard cell library of the present invention according to several embodiments.

Referring now to FIG. 2 a block diagram of the components of the subthreshold standard cell library of the present invention according to several embodiment can be shown and can be generally designated using reference character 10. FIG. 2 can also depict the correlation of the different components of the standard cell library 10.

The components shown in FIG. 2 can include logic gate components 20, operating $V_{dd}$ component 24, synthesis library component 26, and physical library component 28. Referring again to FIG. 2, the operating $V_{dd}$ component 24 can represent the positive operating supply voltage inputs ($V_{dd}$ can be in the subthreshold range shown in FIG. 1). The synthesis library 26 can further contain the timing components 40, temperature components 42 and physical characteristics components 44. The physical makeup describes the properties of the materials, fabrication, etc. A corresponding physical library 28 for each component (library cell), can further include symbol components 50, schematic components 52, and mask layout components 54.

The ultra-low power logic gates 20 in FIG. 2 can be made up of different combinations and quantities of MOSFET (Metal Oxide Semiconductor Field Effect Transistor) devices to create the corresponding Boolean function for logic gates 20. These logic gates 20 can be used to synthesize Application Specific Integrated Circuits (ASICs) that can operate in the subthreshold regime or weak inversion region. Operation in the subthreshold regime can result in much lower power consumption due to a lower applied electric field.

Figure 3:
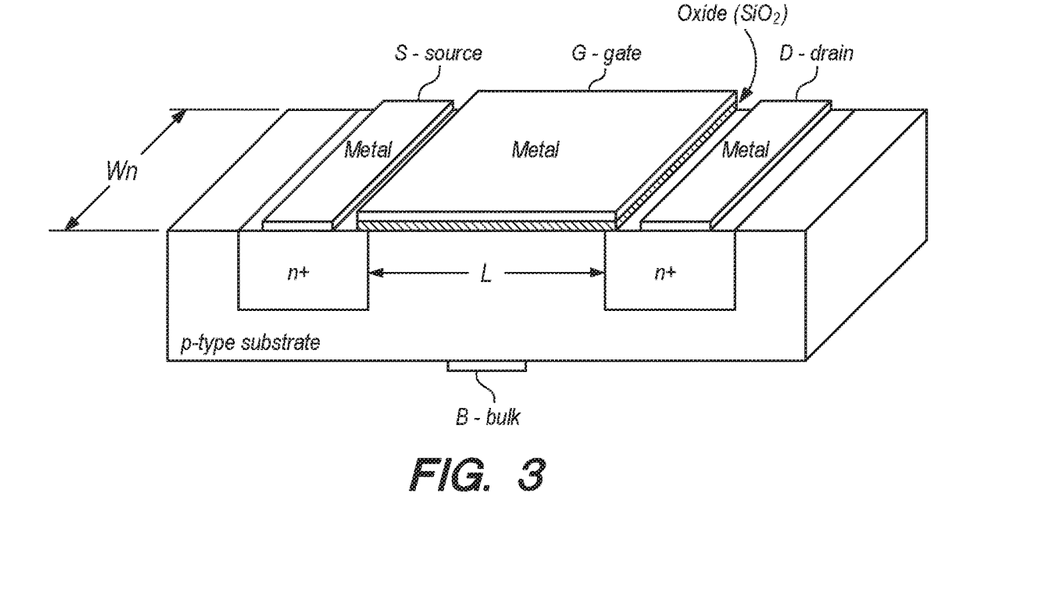
FIG. 3 is a side elevational view of an nMOS transistor portion of a standard cell from the library of FIG. 2.
Figure 4:
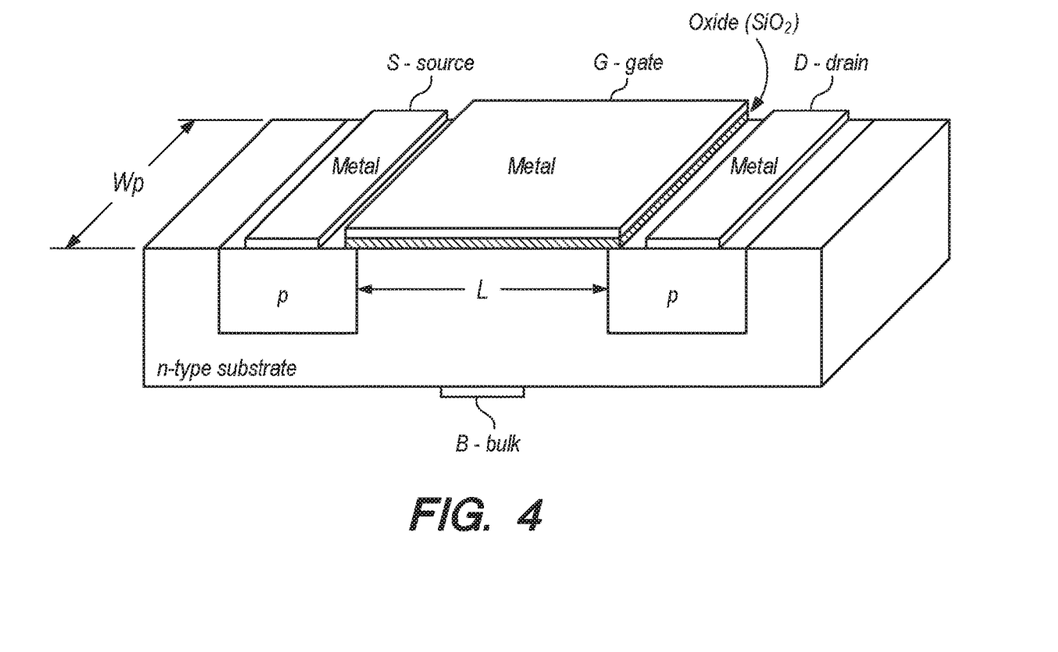
FIG. 4 is a side elevational view of a pMOS transistor portion of a standard cell from the library of FIG. 2.

To optimize operation of gates 20 in the subthreshold regime, and referring now to FIGS. 3 and 4, each n-type CMOS (nMOS) and p-type CMOS (pMOS) transistor in the gate 20 can have a width $W_n$ and $W_p$, respectively. The ratio R of total $W_n/W_p$, which can be the total nMOS to pMOS channel widths for the nMOS and pMOS transistor that make up the applicable logic gate 20 can be varied according to the logic function for the gate 20, while at the same time keeping the channel length L for all the transistors in logic gate 20 constant, to maximize the overall performance of the logic gates 20 in the subthreshold regime (and by extension, the overall performance of the ASIC, in terms of reduced power consumption and reduced heat generation). In several embodiments, the channel length L can be 0.24 µm. Other channel lengths could be used.

Figure 5:
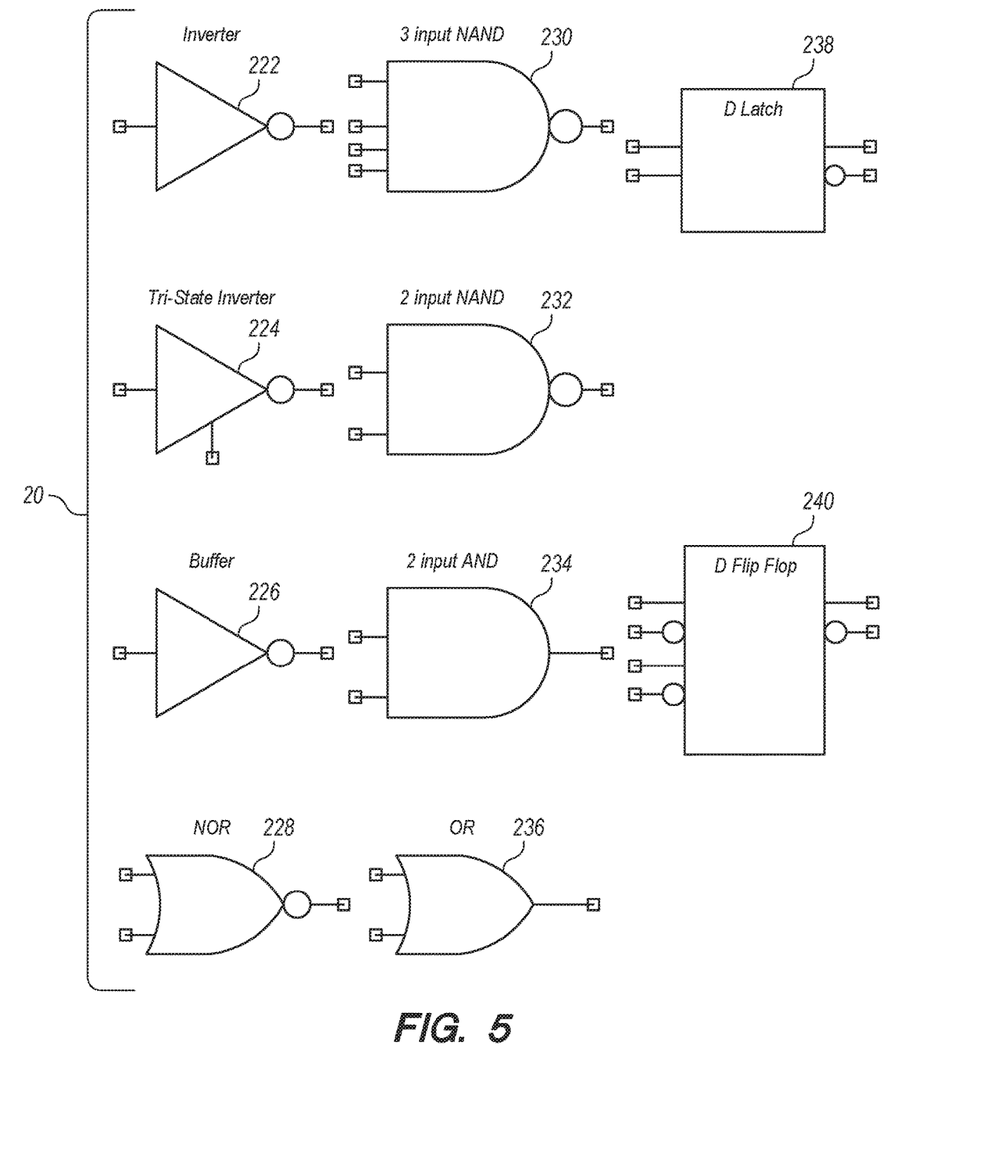

FIG. 5 can be the symbol diagram for each of the ten logic devices that can be included in the subthreshold standard cell library of the present invention according to several embodiments. The subthreshold voltage is characterized by being 10-20% of the nominal bias voltage.

In FIG. 5, the logic gates included in the subthreshold standard cell library are: inverter, tri-state inverter, 3 input NAND, 2 input NAND, 2 input AND, 2 input NOR, 2 input OR, buffer, D latch, and a D flip flop. To maximize operation in the subthreshold region, the nMOS/pMOS ratio R was determined by optimizing the rise and fall and propagation delay. More specifically, the ratio R was chosen so that rise delay and fall delay has the closest values, and further so the propagation delay rise and propagation delay fall had the closes values. This optimization scheme can result in an equal delay between the rise and fall (time between the change in the binary signal) and the equal delay between the propagation delay (the length of time which starts when the input to a logic gate becomes stable and valid to change, to the time that the output of that logic gate is stable and valid to change) for the logic gate 20.

As an example of the above, Table 1 below lists the rise delay, fall delay, propagation delay rise and propagation fall delay for inverter Using such criteria, the ratio R for inverter 222 in FIG. 5 is shown below.

TABLE 1

| $W_p/W_n$ (R) $L_n = L_p =$ 0.24 µm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 60.43 ns | 41.07 ns | 34.5 ns | 34.93 ns |
| 1.08/0.36 (3) | 62.93 ns | 36.46 ns | 40.91 ns | 38.25 ns |
| 1.44/0.36 (4) | 63.87 ns | 37.85 ns | 41.19 ns | 39.82 ns |
| 1.8/0.36 (5) | 64.24 ns | 43.70 ns | 41.56 ns | 40.95 ns |
| 2.16/0.36 (6) | 63.95 ns | 46.92 ns | 42.09 ns | 41.22 ns |
| 2.52/0.36 (7) | 63.18 ns | 48.94 ns | 42.76 ns | 41.99 ns |
| 2.88/0.36 (8) | 62.23 ns | 51.00 ns | 43.02 ns | 42.69 ns |
| 3.6/0.36 (10) | 60.42 ns | 55.51 ns | 43.92 ns | 44.25 ns |
| 3.96/0.36 (11) | 60.79 ns | 61.83 ns | 44.41 ns | 44.21 ns |
| 4.32/0.36 (12) | 60.32 ns | 68.93 ns | 44.86 ns | 44.97 ns |
| 4.68/0.36 (13) | 60.48 ns | 75.17 ns | 45.76 ns | 45.43 ns |
| 5.04/0.36 (14) | 60.20 ns | 80.12 ns | 46.93 ns | 46.57 ns |
| 5.4/0.36 (15) | 60.25 ns | 84.99 ns | 47.50 ns | 47.15 ns |

From the above, it can be seen that for inverter 22 in the library a ratio R of 11 results in an optimized (most closed matched) rise delay of 60.79 ns and fall delay of 61.83 ns, as well as an optimized propagation delay rise and propagation delay fall of 44.41 ns and 44.21 ns, respectively. Table 2 below illustrates the average power consumption for the inverter ratios of Table 1 (using a $V_{dd}$ Voltage source with bias voltage and input signal at 0.45V and at 100 Hz, and where the simulation duration for average power consumption is 0.1 seconds interval spacing 1 u.

TABLE 2

| $W_p/W_n$ (R) $L_n = L_p = 0.24$ μm | Average power (W) |
|---|---|
| 0.72/0.36 (2) | 6.536192 pW |
| 1.08/0.36 (3) | 10.16797 pW |
| 1.44/0.36 (4) | 1.237374 pW |
| 1.8/0.36 (5) | 7.625445 pW |
| 2.16/0.36 (6) | 7.981612 pW |
| 2.52/0.36 (7) | 7.521682 pW |
| 2.88/0.36 (8) | 7.817873 pW |
| 3.6/0.36 (10) | 2.029605 pW |
| 3.96/0.36 (11) | 0.503949 pW |
| 4.32/0.36 (12) | 0.571025 pW |
| 4.68/0.36 (13) | 0.723670 pW |
| 5.04/0.36 (14) | 2.895852 pW |
| 5.4/0.36 (15) | 4.079439 pW |

From the above, it can be seen that the average power is lowest for inverter 222 when ratio R of 11 is used. Finally, Table 3 is a table of average power consumption for a standard foundry model with varying R (using the same conditions as Table 2).

TABLE 3

| $W_p/W_n$ (R) $L_n = L_p = 0.24$ μm | Average power (W) |
|---|---|
| 0.72/0.36 (2) | 19.22355 pW |
| 1.08/0.36 (3) | 18.84233 pW |
| 1.44/0.36 (4) | 12.76747 pW |
| 1.8/0.36 (5) | 14.58337 pW |
| 2.16/0.36 (6) | 16.58434 pW |
| 2.52/0.36 (7) | 17.54507 pW |
| 2.88/0.36 (8) | 27.88722 pW |
| 3.6/0.36 (10) | 19.86581 pW |
| 3.96/0.36 (11) | 20.00879 pW |
| 4.32/0.36 (12) | 19.57516 pW |
| 4.68/0.36 (13) | 20.70518 pW |
| 5.04/0.36 (14) | 26.59364 pW |
| 5.4/0.36 (15) | 26.26062 pW |

From Table 3, it can be seen that the lowest average power (which for the standard model occurs at R=4) is approximately 12.78 pW, which is roughly twenty-five times the average power of 0.5 pW for the inverter 222 building block for logic gate 20 of library 10.

From the above, it can be seen that by maximizing the rise delay, fall delay, propagation delay rise and propagation delay fall to determine the ratio R of nMOS/pMOS channel widths, the systems and methods of the present invention according to several embodiments can be achieved. Referring again to FIG. 5, the ratios R for inverter 222 can be 11:1, 10:1 for tristate inverter 224, 11:1 for buffer 226 and 26:1 for NOR gate 228. Similarly, ratio R can be 2:1 for three-input NAND 230, 3:1 for two-input NAND 232, 4:1 for two-input AND 234 and 20:1 for two-input OR. Still further ratio R can be 2:1 for D latch 238 and 4:1 for D flip flop 240. The ratios R for logic gates 222-240 can allow for efficient operation in the subthreshold region. It should also be appreciated that the ratios above were determined for a Taiwan Semiconductor Manufacturing Company, Limited (TSMC) 0.25 μm process. Other processes can have different ratios for logic gates 222-240. The data which resulting in the above ratios is included in this Specification as an Appendix.

Figure 6:
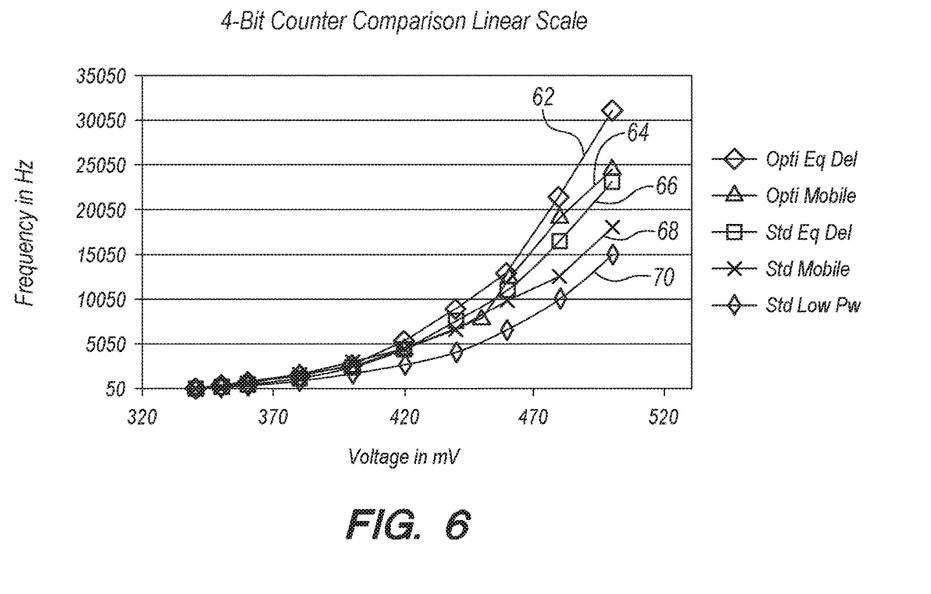

To demonstrate the above ratios for logic gates 222-240, a 4 bit counter test vehicle was fabricated and the test vehicle was operated using the library 10 of the present invention. Other test runs were also accomplished, using other designs. FIG. 6 depicts the results of the test vehicle runs. From referring to FIG. 6, curve 62, which can be the results of the counter test using the systems and methods of the prevent invention, can be compared to curves 64 (a design that optimized equal mobility value between nMOS and pMOS transistor in the logic gates 20), curve 66 (results for a standard cell library with standard cells where ratios R were not modified), curve 68 (standard model received from a foundry) and curve 70 (standard transistor operation in the weak inversion region). As shown in FIG. 6, in addition to a reduction in power an improvement in operating frequency that can be realized from the library 10 of FIG. 1 for the same voltage, when compared to systems of the prior art. As shown by FIG. 6, when the ratios R for logic gates are determined so that the rise and fall delay and propagation delay are substantially equal, a higher operation of operation for the same input voltage can be achieved. As shown in FIG. 6, the ratios R can be determined by optimizing the mobility values for nMOS and pMOS components in the gate 20, but the frequency response will not be as great. However, in both cases, the frequency range of operation is still better the standard low power and standard mobility designs of the prior art (curves 66-70).

The subthreshold standard cell library can further be applied to any ASIC that can require reduced power consumption/improved battery life over outright performance. The library can be used with other fabrication process technologies in design of ASICs. One embodiment is designed on the TSMC 0.25 μm process, but it can be applied to other processes, such as Intel®, IBM® and other TSMC feature sizes. For these processes, different ratios R of $W_n/W_p$ for logic gates 222-240 can be used, if channel length is kept constant and equal delay between rise and fall and propagation is used as the primary criteria.

The subthreshold standard cell library can further be applied to any ASIC that needs reduced power consumption/improved battery life over outright performance.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

APPENDIX

The following tables list the experimental data resulting in the optimized ratios R for the library logic gates 20 for the systems and methods of the present invention.

Inverter 222

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 60.43 ns | 41.07 ns | 34.5 ns | 34.93 ns |
| 1.08/0.36 (3) | 62.93 ns | 36.46 ns | 40.91 ns | 38.25 ns |
| 1.44/0.36 (4) | 63.87 ns | 37.85 ns | 41.19 ns | 39.82 ns |
| 1.8/0.36 (5) | 64.24 ns | 43.70 ns | 41.56 ns | 40.95 ns |
| 2.16/0.36 (6) | 63.95 ns | 46.92 ns | 42.09 ns | 41.22 ns |
| 2.52/0.36 (7) | 63.18 ns | 48.94 ns | 42.76 ns | 41.99 ns |
| 2.88/0.36 (8) | 62.23 ns | 51.00 ns | 43.02 ns | 42.69 ns |
| 3.6/0.36 (10) | 60.42 ns | 55.51 ns | 43.92 ns | 44.25 ns |
| 3.96/0.36 (11) | 60.79 ns | 61.83 ns | 44.41 ns | 44.21 ns |
| 4.32/0.36 (12) | 60.32 ns | 68.93 ns | 44.86 ns | 44.97 ns |
| 4.68/0.36 (13) | 60.48 ns | 75.17 ns | 45.76 ns | 45.43 ns |
| 5.04/0.36 (14) | 60.20 ns | 80.12 ns | 46.93 ns | 46.57 ns |
| 5.4/0.36 (15) | 60.25 ns | 84.99 ns | 47.50 ns | 47.15 ns |

Average Power Consumption ($V_{dd}$ Voltage Source)

| $W_p/W_n$ (R) $L_n = L_p =$ 0.24 μm | Average power (W) |
|---|---|
| 0.72/0.36 (2) | 6.536192 pW |
| 1.08/0.36 (3) | 10.16797 pW |
| 1.44/0.36 (4) | 1.237374 pW |
| 1.8/0.36 (5) | 7.625445 pW |
| 2.16/0.36 (6) | 7.981612 pW |
| 2.52/0.36 (7) | 7.521682 pW |
| 2.88/0.36 (8) | 7.817873 pW |
| 3.6/0.36 (10) | 2.029605 pW |
| 3.96/0.36 (11) | 0.503949 pW |
| 4.32/0.36 (12) | 0.571025 pW |
| 4.68/0.36 (13) | 0.723670 pW |
| 5.04/0.36 (14) | 2.895852 pW |
| 5.4/0.36 (15) | 4.079439 pW |

*Note: Bias voltage and input signal at 0.45 V and at 100 Hz
**Note: Simulation duration for average power consumption is 0.1 seconds interval spacing 1u.

Buffer 226:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 45.16 ns | 36.57 ns | 82.8 ns | 93.17 ns |
| 1.08/0.36 (3) | 51.43 ns | 38.54 ns | 89.7 ns | 95.9 ns |
| 1.44/0.36 (4) | 49.02 ns | 37.17 ns | 91.64 ns | 102.78 ns |
| 1.8/0.36 (5) | 49.02 ns | 40.75 ns | 93.24 ns | 101.56 ns |
| 2.16/0.36 (6) | 47.72 ns | 41.38 ns | 95.44 ns | 99.68 ns |
| 2.52/0.36 (7) | 46.38 ns | 42.38 ns | 97.46 ns | 101.21 ns |
| 2.88/0.36 (8) | 46.24 ns | 41.88 ns | 99.9 us | 100.71 ns |
| 3.24/0.36 (9) | 45.1 ns | 42.52 ns | 102.76 ns | 102.5 ns |
| 3.96/0.36 (11) | 46.71 ns | 46.31 ns | 106.94 ns | 105.53 ns |
| 3.6/0.36 (10) | 44.87 ns | 45.95 ns | 105.71 ns | 103.76 ns |

Average Power Consumption (Pulse Voltage Source)

| $W_p/W_n$ (R) $L_n = L_p =$ 0.24 μm | Average power (W) | Max power (W) |
|---|---|---|
| 0.72/0.36 (2) | 73.11658 fW | 3.044369 uW |
| 1.08/0.36 (3) | 92.50416 fW | 4.257085 uW |
| 1.44/0.36 (4) | 111.9916 fW | 5.460152 uW |
| 1.8/0.36 (5) | 130.500 fW | 6.656804 uW |
| 2.88/0.36 (8) | 184.2369 fW | 10.21994 uW |
| 3.6/0.36 (10) | 219.0724 fW | 12.57932 uW |
| 3.96/0.36 (11) | 235.2159 fW | 13.7554 uW |
| 2.16/0.36 (6) | 148.6701 pW | 7.848439 uW |
| 2.52/0.36 (7) | 166.5515 pW | 9.035939 uW |

Average Power Consumption ($V_{dd}$ Voltage Source)

| $W_p/W_n$ (R) $L_n = L_p =$ 0.24 μm | Average power (W) | Max power (W) |
|---|---|---|
| 0.72/0.36 (2) | 17.52830 pW | 2.205443 uW |
| 1.08/0.36 (3) | 16.22891 pW | 3.330305 uW |
| 1.44/0.36 (4) | 12.42689 pW | 4.441546 uW |
| 1.8/0.36 (5) | 7.969284 pW | 5.564517 uW |
| 2.88/0.36 (8) | 27.87727 pW | 8.974801 uW |
| 3.6/0.36 (10) | 206.4779 pW | 11.24010 uW |
| 3.96/0.36 (11) | 236.9320 pW | 12.37020 uW |
| 2.16/0.36 (6) | 27.03512 pW | 6.716121 uW |
| 2.52/0.36 (7) | 18.57255 pW | 7.841871 uW |

*Note: Bias voltage and input signal at 0.45 V and at 100 Hz
**Note: Simulation duration for average power consumption is 0.5 seconds interval spacing 10u.

2 Input NAND 232:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 143.77 ns | 135.35 ns | 102.38 ns | 104.86 ns |
| 1.08/0.36 (3) | 138.37 ns | 139.13 ns | 104.59 ns | 114.59 ns |
| 1.44/0.36 (4) | 135.58 ns | 156.4 ns | 104.59 ns | 114.97 ns |
| 1.8/0.36 (5) | 129.46 ns | 157.19 ns | 105.72 ns | 117.58 ns |
| 3.6/0.36 (10) | 108.33 ns | 189.06 ns | 112.67 ns | 122.86 ns |

Average Power Consumption (Pulse Voltage Source)

| $W_p/W_n$ (R) $L_n = L_p =$ 0.24 μm | Average power (W) | Max power (W) |
|---|---|---|
| 0.72/0.36 (2) | 93.57470 fW | 3.048625 uW |
| 1.08/0.36 (3) | 124.8680 fW | 4.277557 uW |
| 1.44/0.36 (4) | 146.6081 fW | 5.498727 uW |
| 1.8/0.36 (5) | 167.9930 fW | 6.715042 uW |
| 2.16/0.36 (6) | 188.0403 fW | 7.92726 uW |
| 2.52/0.36 (7) | 207.5102 fW | 9.135804 uW |
| 2.88/0.36 (8) | 226.3173 fW | 10.34096 uW |
| 3.6/0.36 (10) | 263.2399 fW | 12.74203 uW |

Average Power Consumption ($V_{dd}$ Voltage Source)

| $W_p/W_n$ (R) $L_n = L_p =$ 0.24 μm | Average power (W) | Max power (W) |
|---|---|---|
| 0.72/0.36 (2) | 11.34234 pW | 2.341157 uW |
| 1.08/0.36 (3) | 12.62150 pW | 3.459960 uW |
| 1.44/0.36 (4) | 8.688745 pW | 4.600187 uW |
| 1.8/0.36 (5) | 12.89859 pW | 5.744474 uW |
| 2.16/0.36 (6) | 13.64017 pW | 6.882877 uW |
| 2.52/0.36 (7) | 13.59607 pW | 8.015567 uW |
| 2.88/0.36 (8) | 8.668613 pW | 9.143027 uW |
| 3.6/0.36 (10) | 15.1325 pW | 11.38294 uW |

Note:
Bias voltage and input signal at 0.45 V and at 100 Hz
Note:
Simulation duration for average power consumption is 0.5 seconds interval spacing 1u.

2 Input NOR 228:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 229.12 ns | 55.54 ns | 106.03 ns | 83.12 ns |
| 2.88/0.36 (8) | 147.02 ns | 55.68 ns | 78.74 ns | 72.45 ns |
| 3.6/0.36 (10) | 138.55 ns | 62.74 ns | 76.47 ns | 72.92 ns |
| 5.4/0.36 (15) | 125.87 ns | 80.39 ns | 77.12 ns | 75.23 ns |
| 9/0.36 (25) | 118.99 ns | 108.11 ns | 83.9 ns | 81.62 ns |
| 10.8/0.36 (30) | 123.17 ns | 128.28 ns | 89.55 ns | 87.08 ns |
| 9.72/0.36 (27) | 118.59 ns | 122.85 ns | 86.42 ns | 83.64 ns |
| 9.36/0.36 (26) | 119.14 ns | 120.38 ns | 85.19 ns | 82.6 ns |

Average Power Consumption (Pulse Voltage Source)

| $W_p/W_n$ (R) $L_n = L_p =$ 0.24 μm | Average power (W) | Max power (W) |
|---|---|---|
| 0.72/0.36 (2) | 63.49567 fW | 0.6359165 uW |
| 1.08/0.36 (3) | 77.69459 fW | 0.8710397 uW |
| 1.44/0.36 (4) | 91.77050 fW | 1.102320 uW |
| 1.8/0.36 (5) | 89.65141 fW | 1.344427 uW |
| 2.16/0.36 (6) | 102.3988 fW | 1.571413 uW |
| 2.52/0.36 (7) | 115.0624 fW | 1.796447 uW |
| 2.88/0.36 (8) | | |
| 3.6/0.36 (10) | 153.6742 fW | 2.463432 uW |

Average Power Consumption ($V_{dd}$ Voltage Source)

| Wp/Wn (R) Ln = Lp = 0.24 μm | Average power (W) | Max power (W) |
|---|---|---|
| 0.72/0.36 (2) | 3.552893 pW | 0.452131 uW |
| 1.08/0.36 (3) | 3.718928 pW | 0.6536451 uW |
| 1.44/0.36 (4) | 3.974953 pW | 0.8497912 uW |
| 1.8/0.36 (5) | 4.050387 pW | 1.054476 uW |
| 2.16/0.36 (6) | 4.248377 pW | 1.245645 uW |
| 2.52/0.36 (7) | 4.395666 pW | 1.433040 uW |
| 2.88/0.36 (8) | | |
| 3.6/0.36 (10) | 5.020293 pW | 1.976967 uW |

Note:
Bias voltage and input signal at 0.45 V and at 100 Hz
Note:
Simulation duration for average power consumption is 0.5 seconds interval spacing 10u.

2 Input OR 236:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 34.17 ns | 107.6 ns | 78.57 ns | 359.54 ns |
| 1.8/0.36 (5) | 46.10 ns | 127.54 ns | 90.83 ns | 247.88 ns |
| 3.6/0.36 (10) | 62.08 ns | 74.27 ns | 103.62 ns | 168.44 ns |
| 4.32/0.36 (12) | 65.12 ns | 73.61 ns | 108.03 ns | 163.14 ns |
| 5.4/0.36 (15) | 72.69 ns | 84.36 ns | 117.62 ns | 148.58 ns |
| 7.2/0.36 (20) | 88.71 ns | 95.69 ns | 130.67 ns | 150.98 ns |
| 10.8/0.36 (30) | 116.79 ns | 120.00 ns | 155.72 ns | 152.16 ns |
| 11.52/0.36 (32) | 124.45 ns | 126.33 ns | 160.18 ns | 152.36 ns |

Note:
Bias voltage and input signal at 0.45 V and at 100 Hz

2 Input AND 234:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 52.32 ns | 47.67 ns | 204.6 ns | 218.98 ns |
| 1.08/0.36 (3) | 51.54 ns | 54.5 ns | 212.41 ns | 215.75 ns |
| 1.44/0.36 (4) | 51.02 ns | 49.34 ns | 220.24 ns | 207.68 ns |
| 1.8/0.36 (5) | 54.42 ns | 50.34 ns | 225.34 ns | 193.65 ns |
| 3.6/0.36 (10) | 65.64 ns | 57.55 ns | 249.05 ns | 155.91 ns |

Note:
Bias voltage and input signal at 0.45 V and at 100 Hz

3 Input NAND 230:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 151.74 ns | 189.63 ns | 188.34 ns | 165.21 ns |
| 1.08/0.36 (3) | 157.42 ns | 206.4 ns | 192.21 ns | 171.31 ns |
| 1.44/0.36 (4) | 154.34 ns | 218.44 ns | 192.48 ns | 172.86 ns |
| 3.6/0.36 (10) | 136.91 ns | 307.8 ns | 209.66 ns | 181.58 ns |
| 7.2/0.36 (20) | 152.76 ns | 151.77 ns | 286.07 ns | 190.23 ns |
| 10.8/0.36 (30) | 132.32 ns | 406.59 ns | 242.23 ns | 237.39 ns |

Note:
Bias voltage and input signal at 0.45 V and at 100 Hz

D Latch 238:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 173.71 ns | 183.14 ns | 154.07 ns | 144.76 ns |
| 1.08/0.36 (3) | 183.73 ns | 204.45 ns | 153.34 ns | 140.31 ns |
| 1.44/0.36 (4) | 179.83 ns | 219.48 ns | 153.34 ns | 138.32 ns |
| 1.8/0.36 (5) | 181.20 ns | 238.10 ns | 152.94 ns | 142.47 ns |
| 3.6/0.36 (10) | 177.86 ns | 316.30 ns | 159.89 ns | 131.68 ns |

Note:
Bias voltage and input signal at 0.45 V and at 100 Hz

D Flip Flop 240:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 223.51 ns | 197.37 ns | 325.39 ns | 594.56 ns |
| 1.08/0.36 (3) | 235.68 ns | 216.69 ns | 332.99 ns | 606.73 ns |
| 1.44/0.36 (4) | 217.53 ns | 222.67 ns | 330.27 ns | 618.52 ns |
| 1.8/0.36 (5) | 209.59 ns | 231.24 ns | 333.34 ns | 617.38 ns |
| 2.16/0.36 (6) | 197.89 ns | 237.09 ns | 331.19 ns | 617.87 ns |
| 3.6/0.36 (10) | 154.95 ns | 282.9 ns | 308.62 ns | 672.2 ns |

Note:
Bias voltage and input signal at 0.45 V and at 100 Hz

Tri-State Inverter 224:

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 0.72/0.36 (2) | 164.52 ns | 110.80 ns | 118.53 ns | 202.73 ns |
| 1.08/0.36 (3) | 168.76 ns | 110.83 ns | 122.08 ns | 211.22 ns |
| 1.44/0.36 (4) | 173.27 ns | 107.17 ns | 129.53 ns | 204.57 ns |
| 1.8/0.36 (5) | 166.56 ns | 104.3 ns | 141.77 ns | 197.86 ns |
| 3.24/0.36 (9) | 137.16 ns | 128.76 ns | 137.12 ns | 180.70 ns |

-continued

| $W_p/W_n$ (R) $L_n = L_p =$ 0.24 μm | Rise delay (tr) (20%-80%) | Fall delay (tf) (80%-20%) | Prop delay Rise (50%-20%) | Prop delay Fall (50%-20%) |
|---|---|---|---|---|
| 3.6/0.36 (10) | 134.34 ns | 133.67 ns | 137.72 ns | 179.12 ns |
| 3.96/0.36 (11) | 134.05 ns | 147.99 ns | 137.96 ns | 176.87 ns |

Note:
Bias voltage and input signal at 0.45 V and at 100 Hz
Note:
Propagation delay is measured from 50% of the input signal to 20% of the output signal.
Note:
Rise and fall delay is the 80% to 20% difference in the output signal
Note:
On all logic gates there is a fan out of 4 as the load
Note:
".power (Voltage source)" command in T-Spice prints out result in the .out file after simulation.

2NAND 232
ULP Model

| 1.44/0.36 (4) | 135.58 ns | 156.4 ns | 104.59 ns | 114.97 ns |

~13% difference between rise and fall time

Joe Model

| 1.44/0.36 (4) | 341.66 ns | 346.81 ns | 198.18 ns | 192.34 ns |

~1.5% difference between rise and fall time

MOSIS Model

| 1.44/0.36 (4) | 135.58 ns | 156.4 ns | 1.04.59 ns | 114.97 ns |

Does not Function

What is claimed is:

1. A standard cell logic library for synthesizing an application specific integrated circuit (ASIC), said library comprising:
   a plurality of logic gates, each of said logic gates having a rise delay, a fall delay, a propagation delay rise, and a propagation delay fall, and operating in the subthreshold voltage region;
   said logic gates each including different combinations and quantities of n-type and p-type metal oxide semiconductor (nMOS and pMOS) transistors, each said nMOS and each said pMOS transistor further having a constant channel length and a nMOS to pMOS ratio R that will minimize average power consumption during operation in said subthreshold region;
   said ratio R being defined b $W_n/W_p$, where $W_n$ is the total channel width $W_n$ of said nMOS transistors, and $W_p$ is the total channel width of said pMOS transistors;
   said ratio R being chosen so that the rise delay and the fall delay of each said logic gate of said ASIC are substantially equal and so that the propagation delay rise and the propagation delay fall of each said logic gate of said ASIC are substantially equal;
   an operating $V_{dd}$ component including positive supply voltages in the subthreshold voltage region for the respective integrated circuits for said ASIC;
   a synthesis library input component including timing, temperature and physical characteristics of the respective integrated circuits for said ASIC; and
   a physical library component including symbol, schematic and mask layouts for the respective circuits for said ASIC.

2. The logic library of claim 1 wherein the subthreshold region includes a subthreshold voltage characterized by approximately 10-20% of nominal bias voltage.

3. The logic library of claim 2 wherein the logic gates include one or more of the group of inverter, tri-state inverter, 3 input NAND, 2 input NAND, 2 input AND, 2 input NOR, 2 input OR, buffer, D latch, and a D flip flop logic gates.

4. A method for manufacturing an application specific integrated circuit (ASIC) for operation in the subthreshold region, said method comprising the steps of:
   A) establishing a plurality of standard logic gates, each said logic gate having an assigned logic function and a plurality of n-type Metal Oxide Semiconductor (nMOS) and p-type Metal Oxide Semiconductor (pMOS) transistors, each said nMOS transistor having an channel width $W_n$ and a channel length $L_n$, each pMOS transistor having a channel width $W_p$, and a channel length $L_p$;
   B) for each said standard logic gate in said step A), determining a ratio R of $W_n/W_p$ that will minimize the average power consumption, while at the same time maintaining channel length $L_n$ and said channel length $L_p$ constant and equal to each other;
   said ratio R being defined by $W_n/W_p$, where $W_n$ is the total channel width $W_n$ of said nMOS transistors and $W_p$ is the total channel width of said pMOS transistors;
   said ratio R being chosen so that the rise delay and the fall delay of each said logic gate of said ASIC are substantially equal and so that the propagation delay rise and the propagation delay fall of each said logic gate of said ASIC are substantially equal;
   and,
   C) synthesizing said ASIC using said standard logic gates from said step B).

\* \* \* \* \*